United States Patent
Schunk et al.

(10) Patent No.: US 6,767,937 B2
(45) Date of Patent: Jul. 27, 2004

(54) STABILIZER SYSTEM FOR POLYMER COMPONENTS OF DISPLAYS

(75) Inventors: Timothy C. Schunk, Livonia, NY (US); Kurt M. Schroeder, Spencerport, NY (US); Charles H. Appell, Rochester, NY (US); Daniel T. Linehan, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 41 days.

(21) Appl. No.: 10/150,836

(22) Filed: May 17, 2002

(65) Prior Publication Data

US 2003/0097963 A1 May 29, 2003

Related U.S. Application Data

(60) Provisional application No. 60/326,854, filed on Oct. 3, 2001.

(51) Int. Cl.$^7$ .............................................. C08L 1/12
(52) U.S. Cl. .................... 523/448; 524/99; 524/357; 524/359; 524/378; 106/170.1; 106/170.13; 428/413
(58) Field of Search ............................ 428/413; 524/99, 524/357, 359, 378; 523/448; 160/170.1, 170.13

(56) References Cited

U.S. PATENT DOCUMENTS

| | | |
|---|---|---|
| 3,723,147 A | 3/1973 | Wood et al. |
| T950,002 I4 | 9/1976 | Bradley et al. |
| 3,993,662 A | 11/1976 | Brechbuhler et al. |
| 4,137,201 A | 1/1979 | Kuo et al. |
| 4,619,956 A | 10/1986 | Susi |
| 4,839,405 A | 6/1989 | Speelman et al. |
| 5,703,149 A | 12/1997 | Rotzinger et al. |
| 6,013,703 A | 1/2000 | Kuhn et al. |
| 6,103,796 A | 8/2000 | Stanick et al. |
| 2001/0003363 A1 | 6/2001 | Narien et al. |
| 2002/0045015 A1 | 4/2002 | Ito |
| 2003/0073768 A1 * | 4/2003 | Koch et al. .................. 524/323 |

FOREIGN PATENT DOCUMENTS

| | | |
|---|---|---|
| DE | 195 37 140 | 4/1996 |
| GB | 2 293 827 | 4/1996 |
| JP | 05-194788 | 8/1993 |
| JP | 06-130226 | 5/1994 |
| JP | 2001-72782 | 3/2001 |
| WO | WO 01/70868 | 9/2001 |

OTHER PUBLICATIONS

Abstract for JP 52053953; published Apr. 30, 1977; titled "Flame Retardant Styrene Polymers—Stabilised Against Uv And Oxidative Deterioration By Substd Benzotriazoles, Hindered Amines, Hindered Phenol Metal Phosphonates Etc."; of Ciba Geigy AG; corresponds to Defensive Publication T950,002(also enclosed).
US Application No. 10/150,634; filed May 17, 2001; titled "Ultraviolet Light Filter Element"; of Timothy C. Schunk.
Godwin Berner and Manfred Rembold; "New Light Stabilizers For High–Solid Coatings"; Organic Coatings, Science and Technology; vol. 6; (1984) pp. 55–85.
M. Edge, N. S. Allen, and T. S. Jewitt; "The Inhibition of Oxidative and Hydrolytic Degradation Pathways in Archival Cellulose–Tricetate Base Cinematograph Films"; Polymer Degradation and Stability; 29; (1990); pp. 31–48.
S.–K. Wu, G. S. Dai, L.–S. Liu and J.–K. Chang; "A Study of the Photo–stabilizing Behaviors of β–Diketones"; Polymer Degradation and Stability; 16; (1986); pp. 169–186.

* cited by examiner

*Primary Examiner*—David J. Buttner
*Assistant Examiner*—Christopher Keehan
(74) *Attorney, Agent, or Firm*—Andrew J. Anderson

(57) ABSTRACT

Polymer film, coating, and molded article elements for use in a display device are described which comprise a polymer phase having molecularly dispersed therein an acid scavenger compound, a hindered amine light stabilizer compound and a hindered phenol antioxidant compound, wherein the hindered amine light stabilizer compound and the hindered phenol antioxidant compound are present at a weight ratio of from 20:1 to 1:20, and the weight ratio of the acid scavenger compound to the total concentration of hindered amine light stabilizer compound and hindered phenol antioxidant compound is from 10:1 to 1:10. Use of a combination of an acid scavenger and a combination of two radical scavenger antioxidants dispersed in a polymer phase in accordance with the invention enables enhanced stabilization of the polymer when exposed to high heat and/or humidity condition, which has been found to be especially desirable when applied to polymer layers laminated into displays (e.g., polarizers in liquid crystal displays).

13 Claims, 1 Drawing Sheet

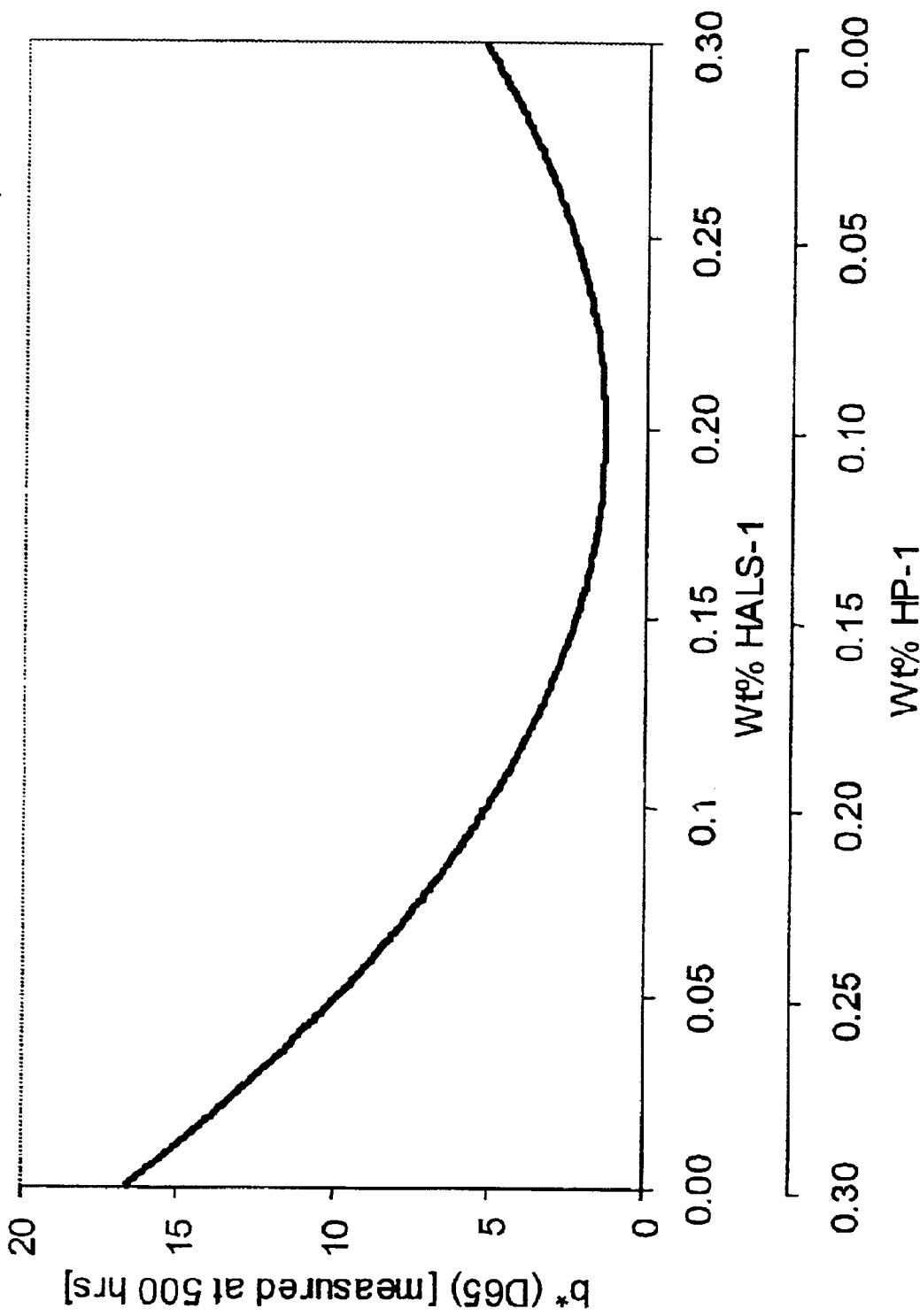
Figure 1: Synergistic effect of HALS-1 and HP-1 stabilizers in TAC film under 85°C, 90%RH conditions.

STABILIZER SYSTEM FOR POLYMER COMPONENTS OF DISPLAYS

CROSS REFERENCE TO RELATED APPLICATIONS

Reference is made to and priority claimed from U.S. Provisional Application Ser. No. 60/326,854 filed Oct. 3, 2001, the disclosure of which is incorporated by reference herein.

Cross-reference is made to copending, commonly assigned U.S. Ser. No. 10/150,634, filed concurrently herewith, which is based upon U.S. Provisional Application Ser. No. 60/326,853 filed Oct. 3, 2001, the disclosures of which are incorporated by reference herein.

FIELD OF THE INVENTION

The present invention relates to combinations of stabilizers in polymer components of display elements to provide protection against the effects of heat, moisture, and oxygen. In a particular embodiment, the invention relates to the use of a combination of an acid scavenger compound, a hindered amine compound and a hindered phenol compound in cellulose acetate film for the fabrication of protective films for polarizers for use in display applications.

BACKGROUND OF THE INVENTION

A variety of approaches have been disclosed for extending the useful life of polymeric objects under exposure to heat, moisture, and oxygen. U.S. Pat. Nos. 3,723,147 and 4,137,201 disclose the improvement of heat stability of cellulose ester polymers in regard to color and inherent viscosity under thermoplastic molding process conditions. The use of combinations of thioether compounds and epoxide compounds is recommended by U.S. Pat. No. 3,723,147. The use of combinations of cyclic phosphonite compounds with hindered phenol compounds and epoxide compounds is shown in U.S. Pat. No. 4,137,201. Both of these approaches are not successful in stabilizing polymers during long term exposure to humidity due the conversion of both thioethers and phosphonites to acidic products, which contribute to the deterioration of polymers.

Japanese Kokai JP 200172782 discloses the use hindered amine light stabilizer (HALS) compounds combined with UV absorbing compounds to reduce discoloration of cellulose ester film under high temperature and humidity when employed in protective sheets for polarizers in liquid crystal displays. Japanese Kokai JP06130226 discloses the use of antioxidant compounds for cellulose acetate, such as phenols or epoxy compounds in combination with hydroxybenzotriazole compounds to reduce discoloration of cellulose ester film under extended exposure to high temperature and humidity when employed in the polarizer of a liquid crystal display. U.S. Pat. No. 4,619,656 discloses the protection of gloss and yellowness index of polymer films against the action of UV light, heat, and humidity by the use of combinations of hindered amine light stabilizers, UV stabilizers, and phenol co-stabilizers. Japanese Kokai JP 05194788 discloses the reduced deterioration of dimensional stability, transparency, and bending strength of cellulose ester photographic film support during exposure to high temperature and humidity through the use of combinations of trimellitate ester plasticizers with hindered phenol compounds and hindered amine compounds or epoxide compounds. Although improved relative to unstabilized polymers, significant discoloration and crazing can still occur with these approaches.

It would be desirable to provide further enhancement in polymer stabilization against deterioration of both spectral and mechanical properties of polymer components of displays in confined environments under long-term use at elevated temperature and humidity.

SUMMARY OF THE INVENTION

In accordance with the invention, polymer film, coating, and molded article elements for use in a display device are described which comprise a polymer phase having molecularly dispersed therein an acid scavenger compound, a hindered amine light stabilizer compound, and a hindered phenol antioxidant compound, wherein the hindered amine light stabilizer compound and the hindered phenol antioxidant compound are present at a weight ratio of from 20:1 to 1:20, and the weight ratio of the acid scavenger compound to the total concentration of hindered amine light stabilizer compound and hindered phenol antioxidant compound is from 10:1 to 1:10. Use of a combination of an acid scavenger and a combination of two radical scavenger antioxidants dispersed in a polymer phase in accordance with the invention enables enhanced stabilization of the polymer when exposed to high heat and/or humidity condition, which has been found to be especially desirable when applied to polymer layers laminated into displays (e.g., polarizers in liquid crystal displays).

BRIEF DESCRIPTION OF THE DRAWINGS

FIG. 1 is a graph showing the dependence of b* CIE D65 color parameter of CTA films from Examples 3 through 7 exposed to 85° C., 90% RH for 500 hours.

DETAILED DESCRIPTION OF THE INVENTION

The present invention describes the use of multiple stabilizing compounds molecularly dispersed in a polymeric phase of a polymeric layer, where at least one is an acid scavenger and two others form a synergistically effective combination of two radical scavenger antioxidants. The stabilizing radical scavengers consist of at least one hindered amine compound and at least one hindered phenol compound.

Hindered amine light stabilizers (HALS compounds) useful in the stabilized polymer components of this invention are known compounds and include, e.g., 2,2,6,6-tetraalkylpiperidine compounds, or the acid addition salts or complexes with metal compounds thereof, as described in U.S. Pat. No. 4,619,956, columns 5–11, and U.S. Pat. No. 4,839,405, columns 3–5, the disclosures of which are incorporated by reference. Such compounds include those of the following Formula I:

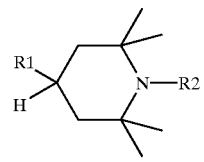

wherein R1 and R2 are H or substituents. Specific examples of hindered amine light stabilizer compounds include 4-hydroxy-2,2,6,6-tetramethylpiperidine; 1-allyl-4-hydroxy-2,2,6,6-tetramethylpiperidine; 1-benzyl-4-hydroxy-2,2,6,6-tetramethylpiperidine; 1-(4-tert-butyl-2-butenyl)-4-hydroxy-2,2,6,6-tetramethylpiperidine;

4-stearoyloxy-2,2,6,6-tetramethylpiperidine; 1-ethyl-4-salicyloyloxy-2,2,6,6-tetramethylpiperidine; 4-methacryloyloxy-1,2,2,6,6-pentamethylpiperidine; 1,2,2,6,6-pentamethylpiperidin-4-yl-beta(3,5-di-tert-butyl-4-hydroxyphenyl)-propionate; 1-benzyl-2,2,6,6-tetramethyl-4-piperidinylmaleinate; (di-2,2,6,6-tetramethylpiperidin-4-yl)-adipate; (di-2,2,6,6-tetramethylpiperidin-4-yl)-sebacate; (di-1,2,3,6-tetramethyl-2,6-diethyl-piperidin-4-yl)-sebacate; (di-1-allyl-2,2,6,6-tetramethyl-piperidin-4-yl)-phthalate; 1-acetyl-2,2,6,6-tetramethylpiperidin-4-yl-acetate; trimellitic acid-tri-(2,2,6,6-tetramethylpiperidin-4-yl)ester; 1-acryloyl-4-benzyloxy-2,2,6,6-tetramethylpiperidine; dibutyl-malonic acid-di-(1,2,2,6,6-pentamethyl-piperidin-4-yl)-ester; dibenzyl-malonic acid-di-(1,2,3,6-tetramethyl-2,6-diethyl-piperidin-4-yl)-ester; dimethyl-bis-(2,2,6,6-tetramethylpiperidin-4-oxy)-silane; tris-(1-propyl-2,2,6,6-tetramethylpiperidin-4-yl)-phosphite; tris-(1-propyl-2,2,6,6-tetramethylpiperidin-4-yl)-phosphate; N,N'-bis-(2,2,6,6-tetramethylpiperidin-4-yl)-hexamethylene-1,6-diamine; N,N'-bis-(2,2,6,6-tetramethylpiperidin-4-yl)-hexamethylene, 1,6-diacetamide; 1-acetyl-4-(N-cyclohexylacetamide)-2,2,6,6-tetramethyl-piperidine; 4-benzylamino-2,2,6,6-tetramethylpiperidine; N,N'-bis-(2,2,6,6-tetramethylpiperidin-4-yl)-N,N'-dibutyl-adipamide; N,N'-bis-(2,2,6,6-tetramethylpiperidin-4-yl)-N,N'-dicyclohexyl-(2-hydroxypropylene); N,N'-bis-(2,2,6,6-tetramethylpiperidin-4-yl)-p-xylylene-diamine; 4-(bis-2-hydroxyethyl)-amino-1,2,2,6,6-pentamethylpiperidine; 4-methacrylamide-1,2,2,6,6-pentamethylpiperidine; alpha-cyano-beta-methyl-beta-[N-(2,2,6,6-tetramethylpiperidin-4-yl)]-amino-acrylic acid methyl ester. Examples of preferred hindered amine light stabilizers include HALS-1 and HALS-2:

dered phenol compounds include n-Octadecyl 3-(3,5-di-t-butyl-4-hydroxyphenyl)-propionate; n-Octadecyl 3-(3,5-di-t-butyl-4-hydroxyphenyl)-acetate; n-Octadecyl 3,5-di-t-butyl-4-hydroxybenzoate; n-Hexyl 3,5-di-t-butyl-4-hydroxyphenylbenzoate; n-Dodecyl 3,5-di-t-butyl-4-hydroxyphenylbenzoate; Neo-dodecyl 3-(3,5-di-t-butyl-4-hydroxyphenyl)propionate; Dodecyl beta (3,5-di-t-butyl-4-hydroxyphenyl)propionate; Ethyl alpha-(4-hydroxy-3,5-di-t-butylphenyl)isobutyrate; Octadecyl alpha-(4-hydroxy-3,5-di-t-butylphenyl)isobutyrate; Octadecyl alpha-(4-hydroxy-3,5-di-t-butyl-4-hydroxyphenyl)propionate; 2-(n-octylthio)ethyl 3,5-di-t-butyl-4-hydroxy-benzoate; 2-(n-octylthio)ethyl 3,5-di-t-butyl-4-hydroxy-phenylacetate; 2-(n-octadecylthio)ethyl 3,5-di-t-butyl-4-hydroxyphenylacetate; 2-(n-octadecylthio)ethyl 3,5-di-t-butyl-4-hydroxybenzoate; 2-(2-hydroxyethylthio)ethyl 3,5-di-t-butyl-4-hydroxybenzoate; Diethyl glycol bis-(3,5-di-t-butyl-4-hydroxy-phenyl)propionate; 2-(n-octadecylthio)ethyl 3-(3,5-di-t-butyl-4-hydroxyphenyl)propionate; Stearamido N,N-bis-[ethylene 3-(3,5-di-t-butyl-4-hydroxyphenyl)propionate]; n-Butylimino N,N-bis-[ethylene 3-(3,5-di-t-butyl-4-hydroxyphenyl)propionate]; 2-(2-stearoyloxyethylthio)ethyl 3,5-di-t-butyl-4-hydroxybenzoate; 2-(2-stearoyloxyethylthio)ethyl 7-(3-methyl-5-t-butyl-4-hydroxyphenyl)heptanoate; 1,2-propylene glycol bis-[3-(3,5-di-t-butyl-4-hydroxyphenyl)propionate]; Ethylene glycol bis-[3,5-di-t-butyl-4-hydroxyphenyl)propionate]; Neopentylglycol bis-[3-(3,5-di-t-butyl-4-hydroxyphenyl)propionate]; Ethylene glycol bis-[3,5-di-t-butyl-4-hydroxyphenylacetate); Glycerine-1-n-octadecanoate-2,3-bis-(3,5-di-t-butyl-4-hydroxyphenylacetate); Pentaethylthritol-tetrakis-[3-(3',5'-di-t-butyl-4'-hydroxyphenyl)propionate]; 1,1,1-trimethylol

HALS-1)

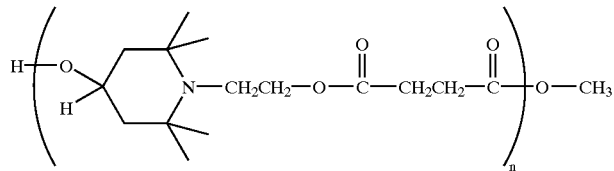

HALS-2)

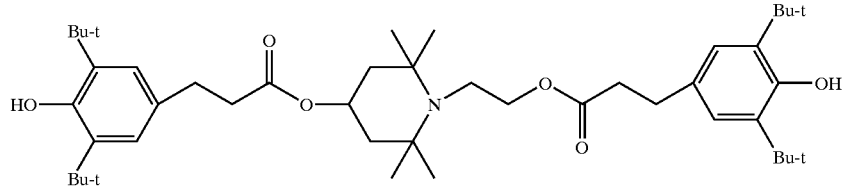

Hindered phenols antioxidant compounds useful in the stabilized polymer components of this invention are also known compounds, and include, e.g., 2,6-dialkylphenol derivative compounds such as described in U.S. Pat. No. 4,839,405 columns 12–14, the disclosure of which is incorporated by reference. Such compounds include those of the following Formula II:

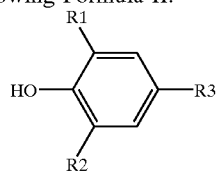

wherein R1, R2 and R3 represent further substituted or unsubstituted alkyl substituents. Specific examples of hinethane-tris-3-(3,5-di-t-butyl-4-hydroxyphenyl)propionate]; Sorbital hexa-[3-(3,5-di-t-butyl-4-hydroxyphenyl)propionate]; 2-hydroxyethyl 7-(3-methyl-5-t-butyl-4-hydroxyphenyl)propionate; 2-stearoyloxyethyl 7-(3 methyl-5-t-butyl-4-hydroxyphenyl)heptanoate; 1,6-n-hexanediol-bis[(3',5'-di-t-butyl-4-hydroxyphenyl)propionate]; pentaerythritol-tetakis(3,5-di-tert-butyl-4-hydroxy hydrocinnamate). Hindered phenolic antioxidant compounds of the above types are available commercially, such as from Ciba Specialty Chemicals under the general trade designations "Irganox 1076" and "Irganox 1010".

Acid scavengers useful in the stabilized polymer components of this invention preferably comprise epoxy compounds such as those acid accepting epoxy compounds described in U.S. Pat. No. 4,137,201, the disclosure of which is incorporated by reference herein. Such acid accepting epoxy compounds are known to the art and include diglycidyl ethers of various polyglycols, particularly those polyglycols that are derived from condensation of say 8 to 40 moles of ethylene oxide or the like per mole of polyglycol product; diglycidyl ethers of glycerol and the like; metallic epoxy compounds (such as those conventionally utilized in and with vinylchloride polymer compositions); epoxidized ether condensation products; diglycidyl ethers of bisphenol A (i.e., 4,4'-dihydroxy diphenyl dimethyl methane); epoxidized unsaturated fatty acid esters, particularly 4 to 2 carbon atom or so alkyl esters of 2 to 22 carbon atom fatty acids such as butyl epoxy stearate and the like; and various epoxidized long chain fatty acid triglycerides and the like, such as the epoxidized vegetable and other unsaturated natural oils (which are sometimes referred to as being epoxidized natural glycerides or unsaturated fatty acids, which fatty acids generally contain between 12 and 22 carbon atoms) that may be specifically typified and particularized by such compositions as epoxidized soya bean oil. Particularly preferred is commercially available epoxy group containing epoxide resin compound EPON 815c, and other epoxidized ether oligomeric condensation products of Formula III In a particularly preferred embodiment, the polymer component of a display related to the current invention is in the form of a polymer film wherein the polymer is a cellulose ester, such as a cellulose acetate, particularly cellulose triacetate. The polymer component in such embodiment may be advantageously employed as a protective film of a polarizing sheet, the polarizing sheet comprising a polarizing plate and the protective film provided on one side or both sides of the polarizing plate. Further, as cellulose triacetate, the known materials can be employed. The acetyl value of cellulose triacetate preferably is in the range of 35 to 70%, especially in the range of 55 to 65%. The weight average molecular weight of cellulose acetate preferably is in the range of 70,000 to 200,000, especially 80,000 to 190,000. The polydispersity index (weight average divided by number average molecular weight) of cellulose acetate is in the range of 2 to 7, especially 2.5 to 4. Cellulose acetate may be obtained from cellulose starting materials derived from either wood pulp or cotton linters. Cellulose acetate may be esterified using a fatty acid such as propionic acid or butyric acid so long as the acetyl value satisfies the range. Otherwise, cellulose acetate may contain other cellulose esters such as cellulose propionate or cellulose butyrate so long as the acetyl value satisfies the range.

Cellulose acetate film generally contains a plasticizer. Examples of the plasticizers include phosphate esters such

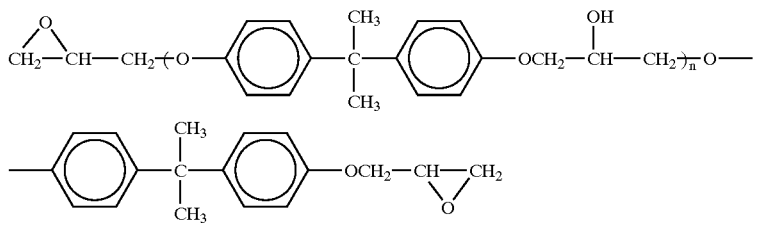

where n equals from 0 to 12. Additional possible acid scavengers, which may be employed, include those described in Japanese Kokai JP 05194788 A2, paragraphs 87–105, the disclosure of which is incorporated by reference.

A ratio of the acid scavenger to the total concentration of hindered amine compound and hindered phenol compound is 10:1 to 1:10 by weight, preferably 4:1 to 1:5 and especially in the range of 2:1 to 1:2. The ratio of hindered amine light stabilizer (HALS) to hindered phenol (HP) in accordance with the invention lies in the range of 1:20 to 20:1 (HALS: HP) by weight, preferably in the range of 1:10 to 10:1, and especially in the range of 1:5 to 5:1.

Examples of polymers employable for the polymer phase of the elements of the invention include polyesters (e.g., polyethylene terephthalate and polyethylene-2,6-naphthalate); cellulose esters (e.g., cellulose diacetate, cellulose triacetate, cellulose acetate propionate and cellulose acetate butyrate); polyolefins (e.g., polypropylene and polyethylene); polymers derived from vinyl chloride (e.g., polyvinyl chloride and vinyl chloride/vinyl acetate copolymer); acrylic resins (e.g., polymethyl methacrylate); polycarbonate esters (e.g., polycarbonate); norbornene resins; and water soluble resins (e.g., polyvinyl alcohol, gelatin).

With respect to the application of this invention in a polymer component of a liquid crystal display, several display elements can be considered including; a polarizing sheet, a polarizing sheet protective film, phase shift sheet, deflector, view angle enhancing film, abrasion resistant film, antiglare film, brightness enhancing film, antireflection film, and antistatic film.

as triphenyl phosphate, biphenylyl diphenyl phosphate, tricresyl phosphate, cresyl diphenyl phosphate, octyl diphenyl phosphate, trioctyl phosphate, and tributyl phosphate; and phthalate esters such as diethyl phthalate, dimethoxyethyl phthalate, dimethyl phthalate, and dioctyl phthalate. Preferable examples of glycolic acid esters are triacetin, tributyrin, butyl phthalyl butyl glycolate, ethyl phthalyl ethyl glycolate, and methyl phthalyl ethyl glycolate. Two or more plasticizers shown above may be combined. The plasticizer is preferably contained in the film in an amount of not more than 20 weight %, especially of 5 to 15 weight %. Films prepared from polymers other than cellulose triacetate may also contain appropriately the above plasticizer.

In preferred embodiments of the invention, the stabilized polymer phase, and in particular a stabilized cellulose acetate film, may contain one or more UV absorbing compounds to provide UV filter element performance and/or act as UV stabilizers for the polymer. Ultraviolet absorbing compounds are generally contained in the polymer in an amount of 0.01 to 20 weight parts based on 100 weight parts of the polymer containing no ultraviolet absorber, and preferably contained in an amount of 0.01 to 10 weight parts, especially in an amount of 0.05 to 2 weight parts. Any of the various ultraviolet light absorbing compounds, which have been described for use in various polymeric elements, may be employed in the polymeric elements of the invention, such as hydroxyphenyl-s-triazine hydroxyphenylbenzotriazole, formamidine, benzophenone, or beuzoxazinone compounds. As described in copending, commonly assigned U.S. Ser. No. 10/150,634, filed concurrently herewith (based on U.S. Provisional Application Ser. No. 60/326,853 filed Oct. 3, 2001) and incorporated by reference above, the use of dibenzoylmethane ultraviolet absorbing compounds in combination with a second UV absorbing compound such as those listed above have been found to be particularly advantageous with respect to providing both a sharp cut off in absorption between the UV and visible light spectral regions as well as increased protection across more of the UV spectrum. Additional possible UV absorbers which may be employed include salicylate compounds such as 4-t-butylphenylsalicylate; and [2,2'thiobis-(4-t-octylphenolate)]n-butylamine nickel(II). Most preferred are combinations of dibenzoylmethane compounds with hydroxyphenyl-s-triazine or hydroxyphenylbenzotriazole compounds.

Dibenzoylmethane compounds, which may be employed, include those of the formula (IV)

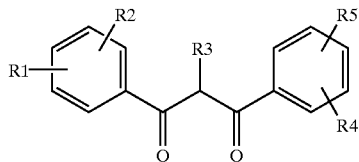

where R1 through R5 are each independently hydrogen, halogen, nitro, or hydroyxl, or further substituted or unsubstituted alkyl, alkenyl, aryl, alkoxy, acyloxy, ester, carboxyl, alkyl thio, aryl thio, alkyl amine, aryl amine, alkyl nitrile, aryl nitrile, arylsulfonyl, or 5–6 member heterocylce ring groups. Preferably, each of such groups comprises 20 or fewer carbon atoms. Further preferably, R1 through R5 of Formula IV are positioned in accordance with

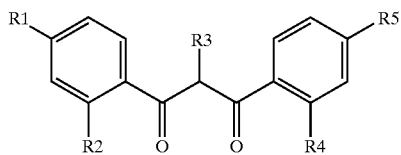

Particularly preferred are compounds of Formula IV-A where R1 and R5 represent alkyl or alkoxy groups of from 1–6 carbon atoms and R2 through R4 represent hydrogen atoms.

Representative compounds of Formula (IV) which may be employed in accordance the elements of the invention include the following:

(IV-1): 4-(1,1-dimethylethyl)-4'-methoxydibenzoylmethane (PARSOL 1789)
(IV-2): 4-isopropyl dibenzoylmethane (EUSOLEX 8020)
(IV-3): dibenzoylmethane (RHODIASTAB 83)

Hydroxyphenyl-s-triazine compounds which may be used in the elements of the invention, e.g., may be a derivative of tris-aryl-s-triazine compounds as described in U.S. Pat. No. 4,619,956, the disclosure of which is incorporated by reference. Such compounds may be represented by Formula V:

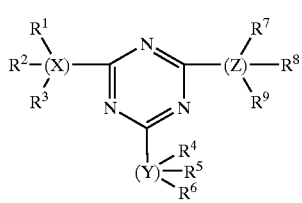

wherein X, Y and Z are each aromatic, carbocylic radicals of less than three 6-membered rings, and at least one of X, Y and Z is substituted by a hydroxy group ortho to the point of attachment to the triazine ring; and each of R1 through R9 is selected from the group consisting of hydrogen, hydroxy, alkyl, alkoxy, sulfonic, carboxy, halo, haloalkyl and acylamino. Particularly preferred are hydroxyphenyl-s-triazines of the formula V-A:

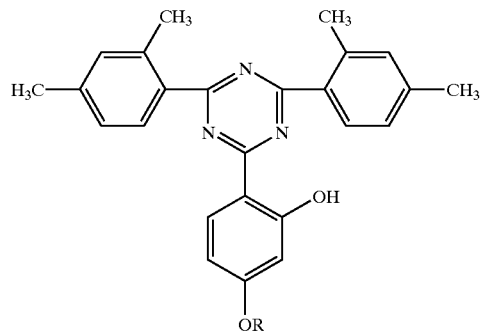

wherein R is hydrogen or alkyl of 1–18 carbon atoms.

Hydroxyphenylbenzotriazole compounds, which may be used in the elements of the invention, e.g., may be a derivative of compounds represented by Formula VI:

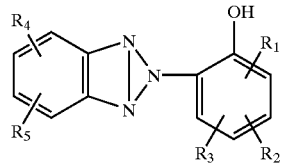

wherein R1 through R5 may be independently hydrogen, halogen, nitro, hydroxy, or further substituted or unsubstituted alkyl, alkenyl, aryl, alkoxy, acyloxy, acyloxy, alkylthio, mono or dialkyl amino, acyl amino, or heterocyclic groups. Specific examples of benzotriazole compounds which may be used in accordance with the invention include 2-(2'-hydroxy-3'-t-butyl-5'-methylphenyl)-5-chlorobenzotriazole; 2-(2'-hydroxy-3',5'-di-t-amylphenyl)benzotriazole; octyl 5-tert-butyl-3-(5-chloro-2H-benzotriazole-2-yl)-4-hydroxybenzenepropionate; 2-(hydroxy-5-t-octylphenyl)benzotriazole; 2-(2'-hydroxy-5'-methylphenyl)benzotriazole; 2-(2'-hydroxy-3 '-dodecyl-5'-methylphenyl)benzotriazole; and 2-(2'-hydroxy-3',5'-di-t-butylphenyl)-5-chlorobenzotriazole.

Formamidine compounds which may be used in the elements of the invention, e.g., may be a formamidine compound as described in U.S. Pat. No. 4,839,405, the disclosure of which is incorporated by reference. Such compounds may be represented by Formula VII or Formula VIII:

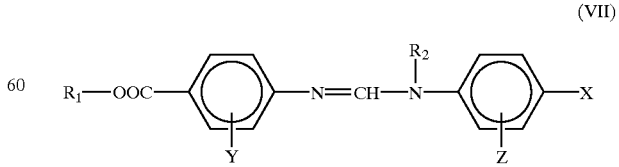

wherein R1 is an alkyl group containing 1 to about 5 carbon atoms; Y is a H, OH, Cl or an alkoxy group; R2 is a phenyl group or an alkyl group containing 1 to about 9 carbon atoms; X is selected from the group consisting of H, carboalkoxy, alkoxy, alkyl, dialkylamino and halogen; and Z is selected from the group consisting of H, alkoxy and halogen;

(VIII)

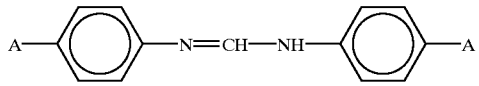

wherein A is —COOR, —COOH, —CONR'R", —NR'COR, —CN, or a phenyl group; and wherein R is an alkyl group of from 1 to about 8 carbon atoms; R' and R" are each independently hydrogen or lower alkyl groups of from 1 to about 4 carbon atoms. Specific examples of formamidine compounds which may be used in accordance with the invention include those described in U.S. Pat. No. 4,839,405, and specifically 4-[[(methylphenylamino)methylene]amino]-, ethyl ester.

Benzophenone compounds which may be used in the elements of the invention, e.g., may include 2,2'-dihydroxy-4,4'dimethoxybenzophenone, 2-hydroxy-4-methoxybenzophenone and 2-hydroxy-4-n-dodecyloxybenzophenone.

The polymer component of the invention may contain particles of an inorganic or organic compound to provide surface lubrication. Examples of the inorganic compound include silicon dioxide, titanium dioxide, aluminum oxide, zirconium oxide, calcium carbonate, talc, clay, calcined kaolin, calcined calcium silicate, hydrate calcium silicate, aluminum silicate, magnesium silicate, and calcium phosphate. Preferred are silicon dioxide, titanium dioxide, and zirconium oxide, and especially silicon dioxide. Examples of the organic compound (polymer) include silicone resin, fluororesin and acrylic resin. Preferred is acrylic resin.

Polymer components in accordance with the invention preferably are in the form of a polymer film. The polymer film is preferably prepared by utilizing a solvent casting method. In more detail, the solvent casting method comprises the steps of: casting the polymer solution fed from a slit of a solution feeding device (die) on a support and drying the cast layer to form a film. In a large-scale production, the method can be conducted, for example, by the steps of casting a polymer solution (e.g., a dope of cellulose triacetate) on a continuously moving band conveyor (e.g., endless belt) or a continuously rotating drum, and then vaporizing the solvent of the cast layer. In a small-scale production, the method can be conducted, for example, by the steps of casting a polymer solution fed from a slit of a solution feeding device on a fixed support having a regular size, such as a metal plate or glass plate by moving the device, and then vaporizing the solvent of the cast layer.

Any support can be employed in the solvent casting method, so long as the support has property that a film formed thereon can be peeled therefrom. Therefore, supports other than the metal and glass plates (e.g., plastic film) are also employable, so long as the supports have the above property. Any die can be employed, so long as it can feed a solution at a uniform rate. Further, as methods for feeding the solution to the die, a method using a pump to feed the solution at a uniform rate can be employed. In a small-scale production, a die capable of holding the solution in an appropriate amount can be utilized.

A polymer employed in the solvent casting method is required to be capable of dissolving in a solvent. Further a film formed of the polymer is generally required to have high transparency and to have little optical anisotropy for application in optical products. Furthermore, the polymer preferably has compatibility with the stabilizers. As the polymer employed in the solvent casting method, preferred is cellulose triacetate. However, other polymers can be employed so long as they satisfy the above conditions.

As a method for the formation of polymer display components other than the solvent casting method, there can be mentioned the known extrusion molding method comprising the steps of mixing the polymer and the stabilizers with melting, and extruding the mixture. The method is generally applied to polymers that cannot utilize the solvent casting method.

A process for the preparation of a polymer display component in the form of an optical polymer film in accordance with preferred embodiments of the invention is explained in detail referring to a cellulose triacetate film. In a mixing vessel, a solvent, cellulose triacetate and a plasticizer are placed, and cellulose acetate is dissolved by stirring (under heating, if desired under pressure) to prepare a dope. In another mixing vessel, a solvent, acid scavenger and anti-oxidants stabilizers are placed, and are dissolved by stirring. In the case that particles to improve surface lubrication are added, the particles may be placed in the resultant stabilizer containing solution and the mixture is dispersed using a dispersing machine to prepare a dispersion. An appropriate amount of the stabilizer containing solution is fed to the vessel holding the dope, and they are mixed. The mixture (dope) is fed to a casting head appropriately through a filter for dope, and is cast from the casting head on a drum or continuous belt of metal (support). The cast film is dried during one rotation of the support to form a film having self-bearing properties, and the dried film is separated from the support, and then the film is sufficiently dried to be wound.

The dope and the stabilizer containing solution can be mixed by the use of a static mixer which is mounted in the piping before the casting head, fed to the casting head and cast from the casting head on a metal drum (support). Any solvent can be employed in the solvent casting method so long as the polymer used (e.g., cellulose triacetate) can be dissolved. The solvent may be a single solvent or a combination of solvents. Examples of solvents employed in the solvent casting method include aliphatic hydrocarbons such as pentane, hexane, heptane, octane, isooctane and cyclohexane; aromatic hydrocarbons such as benzene, toluene and xylene; chlorinated hydrocarbons such as chloromethane, dichloromethane, carbon tetrachloride and trichloroethane; alcohols such as methanol, ethanol, isopropyl alcohol and n-butyl alcohol; ketones such as acetone, methyl ethyl ketone, and cyclohexanone, and esters such as methyl formate, ethyl formate, methyl acetate and ethyl acetate, or dioxalane.

In the case of employing cellulose triacetate as the polymer, a mixed solvent of dichloromethane and methanol is generally employed. Other solvents such as isopropyl alcohol and n-butyl alcohol can be employed so long as cellulose triacetate is not deposited (e.g., during the procedure of preparing the dope or adding the particles to the dope). A ratio of cellulose triacetate and solvent in the dope is preferably 10:90 to 30:70 by weight (cellulose triacetate: solvent).

In the procedure of preparing the dope or the dispersion, various other additives such as a dispersing agent, a fluorescent dye, an antifoamant, a lubricant, UV absorbing dyes can be added to the dope or the dispersion.

In a particularly preferred embodiment, a stabilized polymer component in accordance with the invention comprises a cellulose triacetate film containing from 0.01 to 5 wt % (based on total weight) of compound UV-1 (Parsol 1789) as a first UV absorbing compound, from 0.01 to 5 wt % Tinuvin 326 (UV-3) and from 0.01 to 5 wt % Tinuvin 328 (UV-2) as second UV absorbing compounds, from 0.01 to 10 wt % of a hindered amine light stabilizer compound such as Tinuvin 622 (HALS-1), from 0.01 to 10 wt % of a hindered phenol compound such as Irganox 1010 (HP-1), and from 0.01 to 10 wt % of an epoxy containing acid scavenger compound such as Epon 815c (epoxy group containing oligomeric epoxide resin obtained from monomers of formula E-1), with 0.1–20 wt % of a plasticizer such as triphenylphosphate.

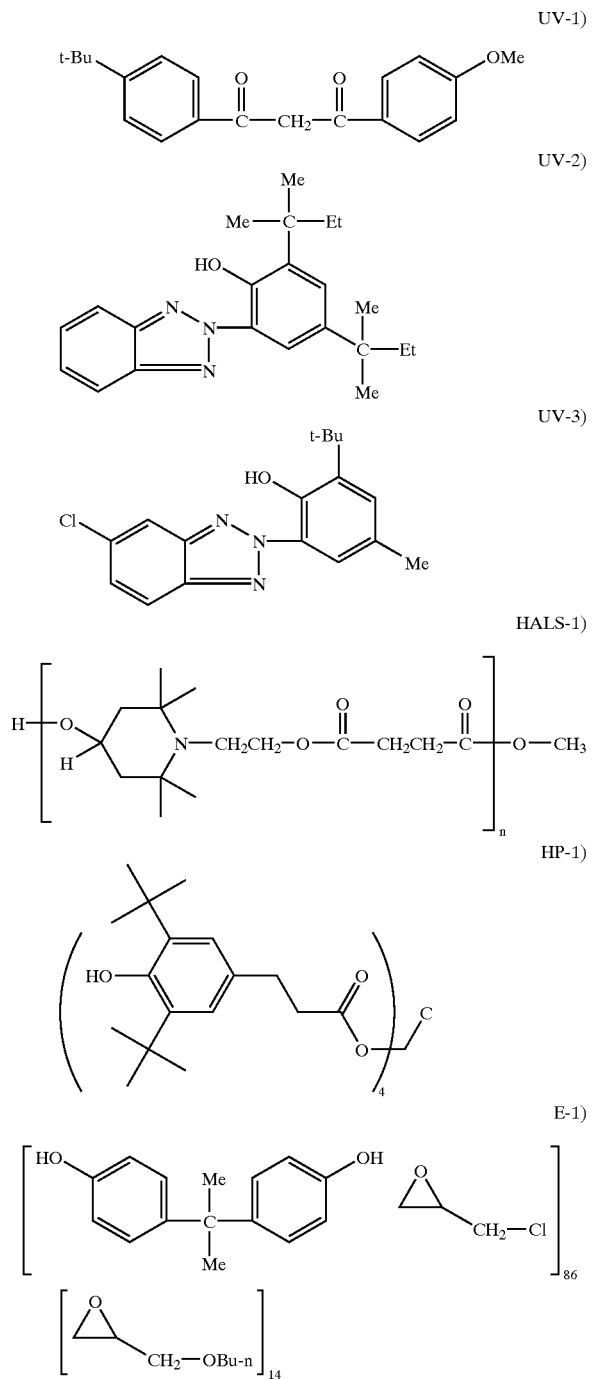

EXAMPLES

Polymer film Example 1 was prepared employing a combination of an acid scavenger compound, a hindered amine light stabilizer compound and a hindered phenol antioxidant compound in accordance with the invention. Comparison film Examples 2–7 were prepared similarly, but in the absence of one or more of such compounds.

Example 1

In a mixing vessel for a polymer dope, 100 weight parts of cellulose acetate (CTA) (combined acetic acid value: 60.8%), 11.8 weight parts of triphenyl phosphate (TPP), 399 weight parts of dichloromethane, 33.4 weight parts of methanol, and 9.3 weight parts of n-butanol were placed, and the cellulose acetate was dissolved by stirring under heating to prepare a dope.

In another mixing vessel, 3.3 weight parts of ultraviolet absorber UV-1, 27.3 weight parts UV-2, 5.2 weight parts UV-3, 8.4 weight parts of HALS-1, 1.7 weight parts of hindered phenol (HP-1), and 8.4 weight parts of epoxide (E-1), having the above structures, 145 weight parts of dichloromethane, 12 weight parts of methanol, and 3.4 weight parts of n-butanol were placed, and stirred to prepare a solution.

To the CTA dope (302 weight parts), 10 weight part of the stabilizer containing solution was added, and they were sufficiently mixed to prepare a uniform solution (dope). The mixed dope was fed to an extrusion die and cast on a moving metal support. After the cast film was separated from the casting surface, the film was dried by passing through a heating zone to prepare a cellulose acetate film having a thickness of 80 $\mu$m providing a polymer film suitable for the protective component of a polarizing plate.

Example 2

(Comparison):

In another mixing vessel, 3.3 weight parts of ultraviolet absorber V-1, 27.3 weight parts UV-2, 5.2 weight parts UV-3, 145 weight parts of dichloromethane, 12 weight parts of methanol, and 3.4 weight parts of n-butanol were placed, and the UV absorbers were dissolved by stirring to prepare a solution. The same procedure as in Example 1 for mixing with CTA dope was then used and a CTA film was prepared in the same manner.

Example 3

(Comparison):

In another mixing vessel, 3.3 weight parts of ultraviolet absorber UV-1, 27.3 weight parts UV-2, 5.2 weight parts UV-3, 10.1 weight parts of HALS-1, 145 weight parts of dichloromethane, 12 weight parts of methanol, and 3.4 weight parts of n-butanol were placed, and stirred to prepare a solution. The same procedure as in Example 1 for mixing with CTA dope was then used and a CTA film was prepared in the same manner.

Example 4

(Comparison):

In another mixing vessel, 3.3 weight parts of ultraviolet absorber UV-1, 27.3 weight parts UV-2, 5.2 weight parts UV-3, 8.4 weight parts of HALS-1, 1.7 weight parts of hindered phenol (HP-1), 145 weight parts of dichloromethane, 12 weight parts of methanol, and 3.4 weight parts of n-butanol were placed, and stirred to prepare a solution. The same procedure as in Example 1 for mixing with CTA dope was then used and a CTA film was prepared in the same manner.

Examples 5 through 7

(Comparisons):

CTA films were prepared as described in Example 4, however the weight ratio of HALS-1 to HP-1 were varied as shown in TABLE 1 while maintaining the combined total weight percent in CTA film constant.

TABLE 1

Stabilizer composition for CTA film Examples 3 through 7.

| CTA film Example | Mixing solution weight HALS-1 [g] | HALS-1 Weight % in CTA film | Mixing solution weight HP-1 [g] | HP-1 Weight % in CTA film | Total weight % in CTA film |
|---|---|---|---|---|---|
| Example 3 | 10.1 | 0.30% | 0.0 | 0.0% | 0.30% |
| Example 4 | 8.4 | 0.25% | 1.7 | 0.05% | 0.30% |
| Example 5 | 5.05 | 0.15% | 5.05 | 0.15% | 0.30% |
| Example 6 | 1.7 | 0.05% | 8.4 | 0.25% | 0.30% |
| Example 7 | 0.0 | 0.0% | 10.1 | 0.30% | 0.30% |

The effectiveness of the stabilized polymer film components prepared as described in the examples above were evaluated both under initial conditions after preparation of the films as well as under environmental stress. Transmission spectra of the example films were obtained versus an air reference over the wavelength range 220 nm to 800 nm by usual procedures. Determination of the CIE human perception color parameters L*, a*, and b* were made using the D65 illumination standard. For environmental stress testing samples were held between 1.1 mm thick pieces of Coring Type 1737-G glass at either 85° C., 90% relative humidity for 600 hours (after conditioning at 90% RH for 2 hours) or 150° C. ambient humidity for 200 hours. Transmission spectra as above were obtained periodically to observe the stability of UV light blocking and perceived color (CIE).

TABLE 2 shows the initial spectral response parameters of the films as cast.

TABLE 2

Spectral properties of stabilized polymer films.

| Sample ID | Initial % T @ 380 nm | Initial % T @ 550 nm | Cutoff range between 5% and 72% T [nm] | Initial L* | Initial a* | Initial b* |
|---|---|---|---|---|---|---|
| Initial parameter values of 80 μm film. | | | | | | |
| Example 1 | 0.93 | 92.0 | 16.9 | 96.8 | −0.14 | 0.62 |
| Example 2 | 0.81 | 92.1 | 16.7 | 96.8 | −0.15 | 0.56 |
| Example 3 | 0.62 | 92.1 | 16.6 | 96.8 | −0.16 | 0.62 |
| Example 4 | 0.83 | 92.0 | 16.8 | 96.8 | −0.15 | 0.62 |
| Example 5 | 1.09 | 92.1 | 17.1 | 96.8 | −0.13 | 0.60 |
| Example 6 | 1.41 | 91.6 | 17.5 | 96.6 | −0.12 | 0.62 |
| Example 7 | 0.90 | 92.2 | 16.9 | 96.9 | −0.15 | 0.58 |
| Initial parameter values of 80 μm film between 1.1 mm Coring 1737-G glass. | | | | | | |
| Example 1 | 0.89 | 78.4 | 24.0 | 91.0 | −0.20 | 0.88 |
| Example 2 | 0.47 | 77.9 | 24.0 | 90.7 | −0.22 | 0.85 |
| Example 3 | 0.90 | 78.3 | 24.2 | 90.9 | −0.20 | 0.93 |
| Example 4 | 0.64 | 78.4 | 23.8 | 90.9 | −0.20 | 0.93 |
| Example 5 | 0.89 | 78.4 | 24.2 | 91.0 | −0.19 | 0.94 |
| Example 6 | 1.37 | 78.6 | 24.4 | 91.0 | −0.17 | 0.88 |
| Example 7 | 0.72 | 78.2 | 24.4 | 90.9 | −0.18 | 1.03 |

Note that parameter values shift relative to free standing films (TABLE 2) due to the presence of two pieces of 1.1 mm Coring 1737 Type G glass intended to entrap volatile degradation components and thereby more closely simulate display device performance conditions. Note that the addition of the stabilizers show no deleterious effects on the spectral response parameters.

TABLE 3 shows the results of the changes to the spectral response parameters of the films after exposure to 150° C. for 200 hours or 85° C. and 90% RH for 600 hours.

TABLE 3

Change in spectral properties of stabilized films after exposure to elevated temperature and humidity.

| Sample ID | Change in % T @ 380 nm | Change in % T @ 550 nm | Change in cutoff range [nm] | Change in L* | Change in a* | Change in b* | Crazing |
|---|---|---|---|---|---|---|---|
| After 150° C. for 200 hours. | | | | | | | |
| Example 1 | 0.1 | −6.0 | 135 | −3.1 | 0.2 | 13.8 | None |
| Example 2 | −0.3 | −77.6 | >150 | −83.4 | >17 | >55 | Severe |
| Example 3 | 0.9 | −53.1 | 306 | −33.1 | 15.8 | 52 | None |
| Example 4 | −0.6 | −48.1 | 312 | −28.8 | 14.1 | 51.3 | None |
| Example 5 | −0.8 | −45.1 | 362 | −27.1 | 11.9 | 47.5 | Severe |
| Example 6 | −1.3 | −74.3 | >212 | −61.4 | 28.0 | 46.8 | Severe |
| Example 7 | −0.1 | −77.3 | >206 | −79.7 | >24 | >43 | Severe |
| After 85° C., 90% RH for 600 hours. | | | | | | | |
| Example 1 | −0.4 | 7.7 | −1.9 | 3.3 | 0.3 | 0.1 | Minor |
| Example 2 | 6.3 | −28.1 | 403 | −16.1 | 0.4 | 21.2 | Severe |
| Example 3 | 6.0 | −3.4 | 158 | −1.9 | −0.4 | 6.1 | Severe |
| Example 4 | 3.4 | −22.9 | >400 | −11.7 | 0.6 | 3.5 | Severe |
| Example 5 | 0.1 | −53.6 | >300 | −43.5 | 2.1 | 8.9 | Severe |
| Example 6 | 7.1 | −14.4 | >300 | −7.9 | −0.7 | 9.2 | Severe |
| Example 7 | 1.6 | −28.0 | >293 | −16.3 | 1.2 | 22.7 | Severe |

Note that samples stored at high relative humidity were preconditioned for 2 hours at 90% RH to simulate equilibrium conditions produced during actual long term device usage. Clearly the performance of the Example 1 film incorporating an acid scavenger and combination of a hindered amine compound and a hindered phenol compound are far superior to all of the other example films shown. This statement is true both in terms of maintenance of transmittance spectral performance as well as maintenance of L*a*b* color and mechanical integrity.

The combination of hindered amine compound and hindered phenol compound employed in accordance with the invention provides a synergistic effect with respect to enhanced color stability under high temperature and humidity conditions. FIG. 1 demonstrates such synergistic effect. The line depicted in FIG. 1 represents the best fit through CIE b* D65 color parameter data from 12 replicate aged samples after 500 hours at 85° C., 90% RH using CTA films prepared in accordance with Examples 3 through 7. The lowest CIE b* value is obtained with the combination of stabilizers, relative to increased levels of either stabilizer alone.

It should be noted in the results shown in TABLE 3 that although moderate improvement in some of the spectral parameters is observed in comparison to the UV absorber only film (Example 2) due to the addition of a HALS compound only (Example 3) or due to addition of a synergistically effective combination of a HALS compound and a hindered phenol compound (Example 4), a further dramatic improvement is found for the full stabilizer formulation in accordance with the invention (Example 1). These results demonstrate the improvement provided by the invention described.

The invention has been described in detail with particular reference to certain preferred embodiments thereof, but it will be understood that variations and modifications can be effected within the spirit and scope of the invention.

What is claimed is:

1. A polymer film, coating, or molded article element for use in a display device comprising a cellulose ester polymer phase having molecularly dispersed therein an acid scavenger epoxy compound, a hindered amine light stabilizer compound and a hindered phenol antioxidant compound, wherein the hindered amine light stabilizer compound and the hindered phenol antioxidant compound are present at a weight ratio of from 20:1 to 1:20, and the weight ratio of the acid scavenger compound to the total concentration of hindered amine light stabilizer compound and hindered phenol antioxidant compound is from 10:1 to 1:10.

2. An element according to claim 1 comprising a cellulose ester film.

3. An element according to claim 2, wherein the acid scavenger epoxide compound comprises a diglycidyl ether of bisphenol A.

4. An element according to claim 2, wherein the hindered amine light stabilizer comprises a 2,2,6,6-tetraalkylpiperidine derivative compound and the hindered phenol comprises a 2,6-dialkylphenol derivative compound.

5. An element according to claim 4, further comprising an ultraviolet light absorbing compound.

6. An element according to claim 5, wherein the ultraviolet absorbing compound comprises a hydroxyphenyl-s-triazine, hydroxyphenylbenzotriazole, formamidine, dibenzoylmethane, benzoxazinone, or benzophenone compound.

7. An element according to claim 6, wherein the hindered amine light stabilizer compound and the hindered phenol antioxidant compound are present at a weight ratio of from 10:1 to 1:10, and the weight ratio of the acid scavenger compound to the total concentration of hindered amine light stabilizer compound and hindered phenol antioxidant compound is from 4:1 to 1:5.

8. An element according to claim 6, wherein the hindered amine light stabilizer compound and the hindered phenol antioxidant compound are present at a weight ratio of from 5:1 to 1:5, and the weight ratio of the acid scavenger compound to the total concentration of hindered amine light stabilizer compound and hindered phenol antioxidant compound is from 2:1 to 1:2.

9. An element according to claim 1, wherein the acid scavenger epoxide comprises a diglycidyl ether of bisphenol A.

10. An element according to claim 1 wherein the hindered amine light stabilizer comprises a 2,2,6,6-tetraalkylpiperidine derivative compound and the hindered phenol comprises a 2,6-dialkylphenol derivative compound.

11. An element according to claim 1, further comprising an ultraviolet light absorbing compound.

12. An element according to claim 11, wherein the ultraviolet absorbing compound comprises a hydroxyphenyl-s-triazine, hydroxyphenylbenzotriazole, formamidine, dibenzoylmethane, benzoxazinone, or benzophenone compound.

13. A liquid crystal display polarizer comprising a protective film comprising a cellulose ester film element according to claim 6.

* * * * *